US008048506B2

(12) United States Patent
Wise

(10) Patent No.: US 8,048,506 B2
(45) Date of Patent: Nov. 1, 2011

(54) CARPET

(76) Inventor: Ronald Wise, Old Hickory, TN (US)

( * ) Notice: Subject to any disclaimer, the term of this patent is extended or adjusted under 35 U.S.C. 154(b) by 211 days.

(21) Appl. No.: 12/370,297

(22) Filed: Feb. 12, 2009

(65) Prior Publication Data
US 2009/0239021 A1 Sep. 24, 2009

Related U.S. Application Data

(60) Provisional application No. 61/028,006, filed on Feb. 12, 2008.

(51) Int. Cl.
B32B 3/02 (2006.01)
(52) U.S. Cl. ............................................ 428/82; 428/88
(58) Field of Classification Search .................... 428/82, 428/88, 95, 157, 192
See application file for complete search history.

(56) References Cited

U.S. PATENT DOCUMENTS

| 2,184,971 | A | * | 12/1939 | Allen | 428/157 |
|---|---|---|---|---|---|
| 3,654,051 | A | * | 4/1972 | Bieler | 428/44 |
| 3,771,787 | A | | 11/1973 | Wood, Jr. | |
| 4,489,115 | A | | 12/1984 | Layman et al. | |
| 4,535,021 | A | | 8/1985 | Friedrich | |
| 4,882,208 | A | | 11/1989 | Breitscheidel et al. | |
| 6,156,396 | A | | 12/2000 | Florian | |
| 6,221,445 | B1 | | 4/2001 | Jones | |
| 6,299,959 | B1 | | 10/2001 | Squires et al. | |
| 6,338,885 | B1 | | 1/2002 | Prevost | |
| 6,602,113 | B2 | | 8/2003 | Lemieux | |
| 6,689,447 | B2 | | 2/2004 | Prevost | |
| 6,740,387 | B1 | | 5/2004 | Lemieux | |
| 6,858,272 | B2 | | 2/2005 | Squires | |
| 6,877,932 | B2 | | 4/2005 | Prevost | |
| 6,955,841 | B2 | | 10/2005 | Weghuis et al. | |
| 6,989,179 | B2 | | 1/2006 | Prevost et al. | |

* cited by examiner

Primary Examiner — Alexander Thomas
(74) Attorney, Agent, or Firm — Gifford, Krass, Sprinkle, Anderson & Citkowski, P.C.

(57) ABSTRACT

A carpet in the form of a substrate formed with a beveled leading edge and including means to form the beveled edge at the point of use and to securely lock adjacent pieces together along an adjacent side edge in a manner which permits the accommodation of different sized and configured areas and assembling and disassembling of the carpet pad to be readily accomplished.

4 Claims, 1 Drawing Sheet

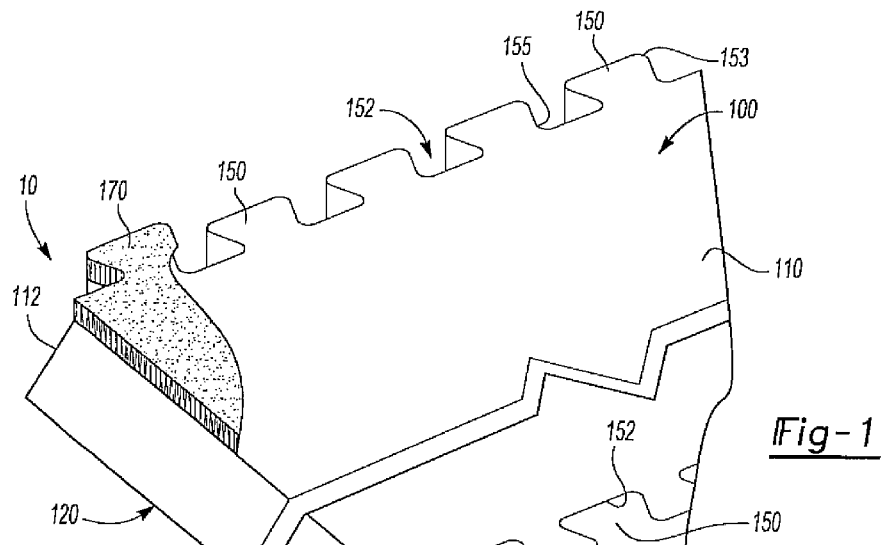
*Fig-1*
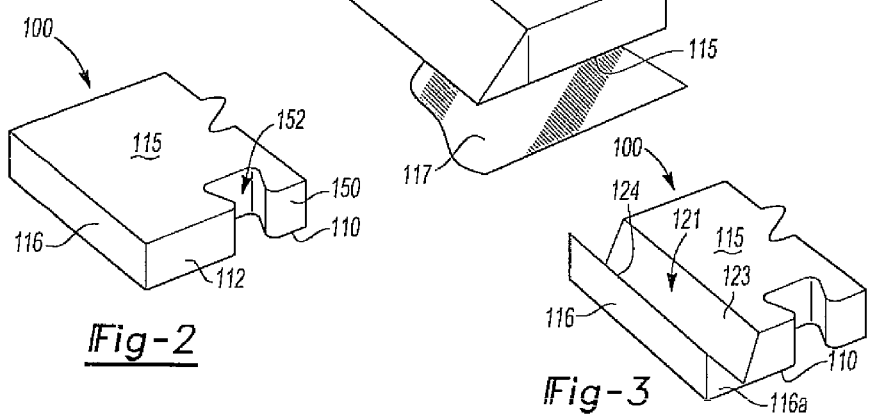
*Fig-2*
*Fig-3*
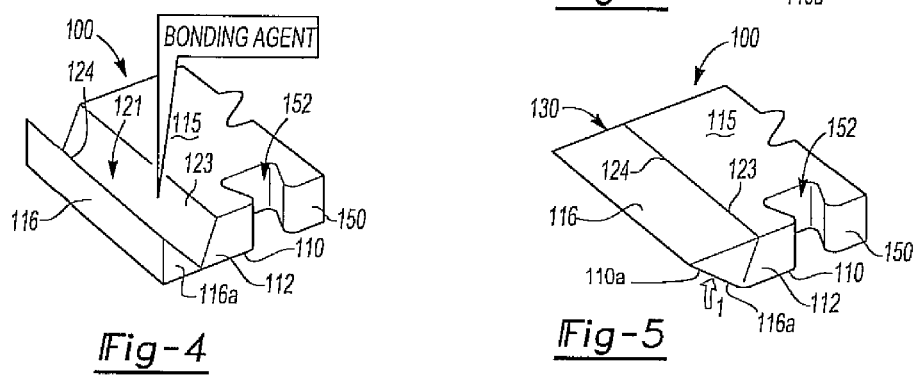
*Fig-4*
*Fig-5*

CARPET

CROSS-REFERENCE TO RELATED APPLICATIONS

This application claims priority of U.S. Provisional Patent Application Ser. No. 61/028,006 filed on Feb. 12, 2008.

FIELD OF THE INVENTION

This invention relates generally to a carpet for use in high traffic walking areas. More specifically, the invention relates to a carpet having means to provide for readily assembling pieces together to fit a given size area and including such a carpet with a leading beveled edge that can be safely used in high traffic areas such as a trade show exhibit or the like and to a method of forming the beveled edge.

BACKGROUND OF THE INVENTION

Trade shows typically are conducted in large areas such as conference centers, with a plurality of businesses exhibiting products, services and the like. Within the trade show exhibit area, individual booths can be set up by the exhibitors with each exhibitor having or renting their own set of equipment for a booth, station, etc. In some instances, the floor of the trade show exhibit area will have carpet, cushioned tiles and the like already in place before the trade show exhibitors arrive. In other instances, a base floor, e.g. a concrete floor is present and the trade show exhibitors themselves are responsible for placing any secondary flooring on top of the concrete if so desired. In any event, the use of carpet on top of a base floor in a trade show exhibit area is known to those skilled in the art, the carpet being laid down either from rolls of material or as a plurality of tiles. However, at the location where the base floor meets the carpet, an elevated edge resulting from the leading edge of the carpet can be present, with the edge requiring a transition such that a tripping hazard is not present. Heretofore edge transitions have been in the form of tape to attempt to bridge the elevated edge with the floor underneath. However, the use of tape can be messy and in fact can become a tripping hazard in high traffic areas in itself if not applied properly or if it becomes loose. Therefore, an improved mat or tile that transitions the elevated edge to the floor underneath using a beveled edge as part of the tile would be desirable.

SUMMARY OF THE INVENTION

Disclosed is a carpet for covering a base floor in heavy traffic areas such as trade show exhibit areas, the carpet having a beveled edge in order to transition the area or location where the base floor meets the carpet. A method of forming the beveled edge is disclosed which permits the beveled edge to be formed on the spot. This is especially important where the carpet is to be used in trade show exhibits or the like because it is difficult to determine the configuration of the exhibit space beforehand and to know which edges will required to be beveled edge.

The carpet includes a substrate with carpeting or the like attached to an upper surface and/or an interlocking tab-and-notch structure that is operable to interlock one piece of the substrate to an adjacent piece of substrate.

The substrate of the present invention is an elastomeric foam material having an interlocking tab-and-notch structure around at least part of the perimeter of the substrate, the substrate also having a beveled edge for edges that will transition between a base floor and the substrate. The beveled edge transitions the substrate to the base floor by decreasing in thickness as a function of distance away from the full thickness substrate. The result is a smooth surface that rises from the base floor to the full thickness substrate.

Also included in the present invention is a method to produce the beveled edge, the method including cutting a V-notch out of the substrate on the lower side of the substrate and then folding the leading end of the substrate upwardly such that the V-notch portion closes upon itself. Once the end is folded such that the V-notch has been closed, the surfaces forming the V-notch are attached to each other by an adhesive or the like to form a beveled edge of the substrate when the substrate is turned over. This of course can be accomplished at the point of use.

BRIEF DESCRIPTION OF THE DRAWINGS

FIG. 1 is a fragmentary perspective view of an embodiment of the present invention;

FIG. 2 is a fragmentary perspective view of an embodiment of the present invention illustrating the method of forming the beveled edge for the substrate;

FIG. 3 is a perspective view similar to FIG. 2 but illustrating a step in the forming of the beveled edge of the substrate;

FIG. 4 is another perspective view similar to FIG. 2 but illustrating another step in the forming of the beveled edge of the substrate; and FIG. 5 is another perspective view similar to FIG. 2 but illustrating the final step in forming a beveled edge of the substrate.

DETAILED DESCRIPTION OF THE PREFERRED EMBODIMENTS

Turning now to FIG. 1, a carpet of the present invention is shown generally at reference numeral 10. The carpet 10 includes a substrate 100 having a top surface 110 and a bottom surface 115. As shown in FIG. 1, a leading edge of the substrate 100 is provided with a beveled edge 120 such that a transition is provided between a base floor 117 and the top surface 110.

Turning now to FIGS. 2-5, an illustration of making the beveled edge 120 is shown. The substrate 100 is shown in a turned over position with the bottom surface 115 on top. In particular, FIG. 2 illustrates that the top surface 110 and the bottom surface 115 terminate at a leading edge 116. A V-notch 121 is formed within the substrate 100 as shown in FIG. 3, the V-notch 121 being formed by any method known to those skilled in the art, illustratively including the use of razor blades, hot wire cutters, lasers, carpet knives, torches and the like. It is appreciated that the notch extends from the edge of the surface 115 at the leading edge 116 and the notch 121 needs to be wide enough at the surface 115 to create an inclined surface 110a (FIG. 5) from a portion of the surface 110 when the notch 121 is closed.

After the V-notch 121 has been formed, two opposing surfaces 123 and 124 and a leading edge section 116a are created defining the notch 121. Folding of the leading edge section 116a of the substrate 100 in a generally upward direction 1 (FIG. 5) causes the opposing surfaces 123 and 124 to be brought into physical contact with each other to the position shown in FIG. 5. When the opposing surfaces 123 and 124 are in contact, the surface 116 originally at the end of the substrate 100 is brought to a position aligned with the top surface 110 as illustrated in FIG. 5. As such, the beveled edge 120 as shown in FIG. 1 is provided. It is appreciated that the opposing surfaces 123 and 124 can be at least partially attached to each other using any method or mechanism known to those skilled in the art, illustratively including adhesives, heat, ultrasonic welding and the like. In this manner, the beveled edge 120 formed upon bringing the opposing surfaces 123 and 124 in contact with each other can be maintained.

The substrate 100 is turned over and it is ready for use. It is appreciated that a carpeting 170 (FIG. 1) can be placed adjacent to the top surface 110 and permanently attached thereto such that an aesthetically pleasing carpet 10 is provided for trade show exhibit areas. It is also appreciated that the embodiment shown can be placed on the base floor 117 (FIG. 1) from a roll or in the form of tiles instead of in the form of rolled carpet. If this is the case, then only certain tiles will have the beveled edge 120, these tiles being ones that transition from the base floor 117 to the elevated carpet 10.

As best seen in FIG. 1 the perimeter of the substrate 100 is provided with an interlocking tab-and-notch structure to permit adjacent substrates 100 and carpeting 170 to be locked together to cover the area to be carpeted. The interlocking tab-and-notch structure includes an interlocking tab 150 with an interlocking notch 152 adjacent thereto. The interlocking tab 150 extends from a sidewall 112 of the substrate 100 in a generally outward direction. As illustrated in FIG. 1, the tab 150 has a shape that fits within the interlocking notch 152 of an adjacent substrate 100. Given that the interlocking notch 152 is adjacent to the interlocking tab 150, the outline of the notch 152 mirrors the shape of the tab 150. In this manner, the interlocking structure having interlocking notches 152 that fit securely around interlocking tabs 150, and/or vice-versa, is provided. An example of how two adjacent pieces of the base pad 100 interlock together is best illustrated in FIG. 1. Once the interlocking tab 150 is placed within the interlocking notch 152, the wider outer portion 153 of the tab 150 within the wider inner portion 155 of the notch 152 prevents the tab 150 from being removed when the substrate 100 is pulled upon in a coplanar direction with respect to the adjacent substrate 100. In this manner, a plurality of substrates 100 can be easily interlocked to each other by inserting the interlocking tabs 150 within the interlocking notches 152 from a generally vertical direction. In addition, it is appreciated that once the substrates 100 have been laid upon the floor and adjacent rolls or tiles of substrates 100 have been locked together, they are securely attached to one another to cover an area as a secure unitary pad.

Although FIGS. 1-3 illustrate a particular shape for the interlocking tab 150 and interlocking notch 152, other shapes and types of interlocking tabs and notches are within the scope of the present invention. In fact, within the scope of the present invention are interlocking tabs and interlocking notches of various sizes and shapes, so long as the combination provides a secure interlocking engagement between adjacent substrates.

In this manner, a carpet with a beveled leading edge having special utility for use in trade show exhibit areas is provided. The beveled edge can be readily formed at the point of use. In addition, the carpet is provided with an interlocking attachment to join adjacent pieces. This permits carpet even for large exhibit areas to be easily transported to the point of use and to be formed there with a beveled edge where needed and put in place. Once at the point of use the necessary size to cover the particular area can be readily achieved and the carpet can be laid and taken up with ease. Yet a carpet which is secure and which avoids hazards caused by loose carpeting in high traffic areas is provided In addition, the foregoing drawings, discussion and description are illustrative of specific embodiments of the present invention, but they are not meant to be limitations upon the practice thereof. Numerous modifications and variations of the invention will be readily apparent to those of skill in the art in view of the teachings presented herein. It is the following claims, including all equivalents, which define the scope of the invention.

I claim:

1. A carpet for covering the floor comprising:
 a substrate having a full thickness portion, a top surface, a bottom surface, a leading surface, and a side edge, said top surface and said bottom surface terminating at said leading surface;
 a V-notch formed within the full thickness portion of the substrate adjacent said leading surface, said V-notch providing inclined, space opposing surfaces extending from said bottom surface to a point adjacent said top surface;
 said pair of opposing surfaces being adhered to each other whereby said leading surface becomes a leading extension of said bottom surface and a leading portion of said top surface is inclined toward said bottom surface.

2. The pad as defined in claim 1 and including; carpeting atop said top surface of said substrate.

3. The pad as defined in claim 1 and including; a plurality of notches and tabs formed along said side edge of said substrate to interlock with notches and tabs formed along the side edge of an adjacent substrate whereby adjacent substrates can be joined by inserting said tabs of each of said substrates into said notches of the other of said substrates.

4. The pad as defined in claim 3 and including; carpeting adhered to said top surface of said substrate.

* * * * *